United States Patent
Nakagawa et al.

(10) Patent No.: US 6,624,858 B2
(45) Date of Patent: *Sep. 23, 2003

(54) LIGHT SCATTERING TYPE LIQUID CRYSTAL DISPLAY PANEL FOR TIMEPIECE

(75) Inventors: Koji Nakagawa, Hachioji (JP); Kanetaka Sekiguchi, Sayama (JP)

(73) Assignee: Citizen Watch Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/463,754

(22) PCT Filed: Aug. 3, 1998

(86) PCT No.: PCT/JP98/03445
§ 371 (c)(1),
(2), (4) Date: Jan. 31, 2000

(87) PCT Pub. No.: WO99/06882
PCT Pub. Date: Nov. 2, 1999

(65) Prior Publication Data
US 2002/0071069 A1 Jun. 13, 2002

(30) Foreign Application Priority Data
Aug. 1, 1997 (JP) .............................. 9/207457
Aug. 1, 1997 (JP) .............................. 9/207459

(51) Int. Cl.[7] ...................... G02F 1/1333; G02F 1/1335
(52) U.S. Cl. .............................. 349/84; 349/62; 349/65; 349/98; 349/113; 349/115
(58) Field of Search .................. 349/84, 62–65, 349/86, 96–98, 106, 113, 115

(56) References Cited

U.S. PATENT DOCUMENTS

| | | | | |
|---|---|---|---|---|
| 4,500,173 A | * | 2/1985 | Leibowitz et al. | 350/345 |
| 5,124,183 A | * | 6/1992 | Nakano et al. | 428/1 |
| 5,434,688 A | * | 7/1995 | Saitoh et al. | 359/67 |
| 5,581,380 A | * | 12/1996 | Bergman | 349/63 |
| 5,677,744 A | * | 10/1997 | Yoneda et al. | 349/12 |
| 5,686,979 A | * | 11/1997 | Weber et al. | 349/96 |
| 5,783,120 A | * | 7/1998 | Ouderkirk et al. | 264/1.34 |
| 5,808,794 A | * | 9/1998 | Weber et al. | 359/487 |
| 5,841,738 A | * | 11/1998 | Kamei et al. | 368/205 |
| 6,124,971 A | * | 9/2000 | Ouderkirk et al. | 359/487 |
| 6,211,933 B1 | * | 4/2001 | Mizunuma et al. | 349/113 |
| 6,262,842 B1 | * | 7/2001 | Ouderkirk et al. | 359/487 |

FOREIGN PATENT DOCUMENTS

| | | |
|---|---|---|
| DE | 30 05 777 | 2/1979 |
| EP | 0 814 365 A2 | 12/1997 |
| EP | 0814365 A2 | 12/1997 |
| EP | 0814366 A2 | 12/1997 |

(List continued on next page.)

Primary Examiner—Tarifur R. Chowdhury
(74) Attorney, Agent, or Firm—Armstrong, Westerman & Hattori, LLP

(57) ABSTRACT

A liquid crystal display panel for a timepiece comprises: a polymer dispersed liquid crystal cell (10) which is structured by respectively forming an opposed electrode (2) on a first substrate (1) of a pair of transparent substrates and a signal electrode (4) on a second substrate (3), and sealing a liquid crystal layer (5) containing a liquid crystal and a polymer material between the first substrate (1) and the second substrate (3) to form pixel portions at intersections between the signal electrode (4) and the opposed electrode (2); a reflector (15) which transmits a portion of light, placed on the side of a face, on which the opposed electrode (2) is not formed, of the first substrate (1); and an auxiliary light source placed on the outer side of the reflector (15), so that time information can be displayed with good visibility even when the auxiliary light source is turned off.

12 Claims, 10 Drawing Sheets

FOREIGN PATENT DOCUMENTS

| | | | | | |
|---|---|---|---|---|---|
| JP | 54-153066 | 12/1979 | JP | 7-168174 | 4/1995 |
| JP | 2-47629 | 3/1990 | JP | 9-61819 | 3/1997 |
| JP | 3-196018 | 8/1991 | JP | 9-127504 | 5/1997 |
| JP | 5-17626 | 3/1993 | JP | 9-164622 | 6/1997 |
| JP | 5-127184 | 5/1993 | JP | 11038452 | 2/1999 |
| JP | 5-241134 | 9/1993 | WO | WO-95-/17691 * | 6/1995 |
| JP | 6-230371 | 8/1994 | WO | WO95/33224 | 12/1995 |
| JP | 7-10726 | 2/1995 | WO | WO97/01788 | 1/1997 |
| JP | 7-49485 * | 2/1995 | WO | WO 97/01788 | 1/1997 |
| JP | 7-56157 | 3/1995 | WO | WO97/06464 | 2/1997 |

\* cited by examiner

LIGHT SCATTERING TYPE LIQUID CRYSTAL DISPLAY PANEL FOR TIMEPIECE

TECHNICAL FIELD

The present invention relates to a liquid crystal display panel for a timepiece for displaying at least either of time information such as an hour, a minute, and a second, or calendar information such as a date, days of the week, a month, and a year by use of a liquid crystal display panel, and more particularly, to not only a liquid crystal display panel for indicating digital display of time information and calendar information but also a liquid crystal display panel for a combination timepiece for indicating digital display and analog display of time information by hands, or an analog timepiece for indicating markers and so forth on a dial thereof, or for indicating simulated hands for an hour hand, a minute hand, and a second hand, by the liquid crystal display panel. The timepiece includes a watch and a clock.

BACKGROUND TECHNOLOGY

A timepiece for indicating digital display of time information such as an hour, a minute, and a second, and calendar information such as a date, days of a week, a month, a year, by use of a liquid crystal display panel, has been in widespread use for wrist watches and clocks, provided with a crystal oscillation circuit.

There has also been in use a combination timepiece in which analog display for indicating time information by the hands of the watch is used in combination with digital display indicating time information and calendar information in numbers and letters.

Further, there has also been proposed an analog timepiece for selectively displaying markers in various patterns, or for displaying simulated hands for an hour hand, a minute hand, and a second hand, by providing the dial thereof based on a liquid crystal display panel (referred to, for example, Japanese Patent Laid-open S54-153066).

In a conventional liquid crystal display panel for displaying time information and calendar information, used in such a timepiece, a liquid crystal cell which is filled with a liquid crystal is sandwiched between two transparent substrates having an electrode on respective inner surfaces thereof, facing each other, and an upper polarizing film and a lower polarizing film are disposed, respectively, on the external surface of the substrates. If an electric field is applied to the liquid crystal by applying a voltage between a pair of electrodes on the substrates of the liquid crystal cell, the optical characteristic of the liquid crystal is changed, thereby locally controlling transmission and absorption of light made incident on the liquid crystal display panel such that a predetermined display is effected.

As the liquid crystal, a twisted nematic (TN) liquid crystal having a twist angle of less than 90° is mainly used, and a super twisted nematic (STN) liquid crystal having a twist angle of 170° to 240° is occasionally used.

Either of the upper polarizing film or the lower polarizing film is a polarizing film absorbing the light linearly polarized in the direction orthogonal to the transmission axis thereof.

In the case of a timepiece using the conventional liquid crystal display panel described above, time information and calendar information are displayed in black against a white background in a normally white mode that is common.

However, by simply displaying time information and calendar information in black against the white background as described in the foregoing, neither variation in design nor interest can be offered, with a resulting tendency to lose soon popularity with consumers. Probably, as a result, consumption of digital timepieces has recently been on the decline, and neither combination timepieces nor analog timepieces with a liquid crystal display panel have since received market acceptance.

In light of the present situation as described, the invention has been developed, and an object thereof is to provide a liquid crystal display panel for a timepiece capable of providing attractive variation in design while indicating a digital display or an analog display.

In recent years, a liquid crystal display panel having a liquid crystal layer containing a liquid crystal and a polymer material has been developed. It is expected to improve visibility of a digital timepiece as well as decoration of the liquid crystal display panel thereof, by displaying time information, calendar information, and the like through the use of the liquid crystal display panel for the timepiece.

The liquid crystal display panel having a liquid crystal layer containing a liquid crystal and a polymer material employs a light scattering type liquid crystal cell, therefore it can transmit almost all incident light because it does not need a polarizing film and an alignment film. Accordingly, the liquid crystal display panel effects high utilization efficiency of light, thereby displaying a bright white screen by virtue of its becoming opaque white.

This type of liquid crystal cell is broadly divided into a polymer network type and a polymeric dispersed type. In a polymer network liquid crystal cell, a polymer is formed into compact and random three-dimensional network structure in continuous layers of a liquid crystal, and the liquid crystal is aligned at a wall of the polymer network. Therefore, the liquid crystal layer becomes a uniform optical anisotropic medium to scatter light strongly.

The polymer dispersed liquid crystal cell, in which a liquid crystal forms minute particulate drops and is dispersed in a polymer medium, scatters light at the interface of the liquid crystal and the polymer due to inconsistency of their refractive indexes.

At this moment, a projection-type liquid crystal display device and a reflection-type liquid crystal display device with the liquid crystal display panel using a mixed material of a polymer material and a liquid crystal for the liquid crystal layer have been developed. However, in regard with an application of the liquid crystal display panel for a timepiece, there is only a case where a liquid crystal display panel is placed on the glass side of the timepiece and its user presses a button of a setting-terminal input portion to apply a voltage to the scattering type liquid crystal layer, thereby the liquid crystal layer becomes opaque white resulting in display.

In such a liquid crystal display panel which controls degree of scattering by a difference in refractive index between the liquid crystal and the polymer material to indicating a display, it is difficult to obtain an excellent contrast ratio between a scattering state and a transmission state in either case where an external light is utilized or where an auxiliary light source is utilized.

Moreover, it is more difficult to obtain an excellent contrast by a simple structure, such a liquid crystal display panel has not used in a timepiece having an auxiliary light source at present. Therefore, it is desired to achieve an excellent contrast ratio by a simple structure in either case where an external light is utilized or where an auxiliary light source is utilized.

DISCLOSURE OF THE INVENTION

In light of the present situation as described, the present invention is made, and an object thereof is to provide a liquid crystal display panel for a timepiece capable of displaying time information and calendar information, also capable of a color display, and excellent in apparent design with a simple structure, high brightness, and excellent contrast, regardless of the presence or absence of an auxiliary light source, by utilizing a light scattering type liquid crystal cell.

To achieve the above object, in the present invention, a light scattering type liquid crystal cell is structured by respectively forming an opposed electrode on a first substrate of a pair of transparent substrates and a signal electrode on a second substrate, and sealing a liquid crystal layer containing a liquid crystal and a polymer material between the first substrate and the second substrate to form pixel portions at intersections between the signal electrode and the opposed electrode.

A liquid crystal display panel for a timepiece is structured by placing a reflector on the side of a face, on which the opposed electrode is not formed, of the first substrate constituting the light scattering type liquid crystal cell.

An excellent contrast ratio can be obtained also with the light scattering type liquid crystal cell by strong reflected light by the reflector.

Provision of a color film with a low scatterability between the first substrate and the reflector enables a color display.

Moreover, a light-accumulating source having elements for absorbing light energy and emitting light in different wavelengths can be also provided between the first substrate and the reflector, on the side opposite to the first substrate with respect to the reflector, or in the liquid crystal layer.

A reflector for transmitting a portion of light is employed as the above reflector, thereby facilitating a color display and indicating a transmission-type display.

In the above case, a light absorption film is preferably provided on the side opposite to the first substrate with respect to the reflector.

A color filter is preferably placed on the first substrate side or on the opposite side thereof with respect to the reflector for transmitting a portion of light.

A light-accumulating source having elements for absorbing light energy and emitting light in different wavelengths is preferably provided on the side opposite to the first substrate with respect to the reflector for transmitting a portion of light.

Provision of an auxiliary light source on the side opposite to the first substrate with respect to the reflector for transmitting a portion of light enables transmission-type display at a place with little or no ambient light.

A color film with a low scatterability is preferably provided between the reflector for transmitting a portion of light and the first substrate or the auxiliary light source.

A color filter may be provided between the reflector for transmitting a portion of light and the first substrate or the auxiliary light source.

A reflection-type polarizing film which transmits the light linearly polarized in the direction parallel to the transmission axis thereof and reflects the light linearly polarized in the direction orthogonal to the transmission axis thereof is preferably used as the reflector for transmitting a portion of light.

In the above case, it is desirable that a polarizing film is provided on the first substrate side or on the opposite side thereof with respect to the reflection-type polarizing film in such a manner that the transmission axis of the polarizing film and the transmission axis of the reflection-type polarizing film are nearly parallel or orthogonal to each other.

An auxiliary light source is preferably provided at the outermost position on the side opposite to the visible side of the light scattering type liquid crystal cell.

The reflection-type polarizing film is preferably a reflection-type polarizing film having a reflectance different in response to wavelength within the visible light region.

The reflector for transmitting a portion of light may be a reflector which selectively reflects the light having a certain wavelength in the visible light and transmits the light having the other wavelengths.

The auxiliary light source is preferably a light source having a light emission characteristic of the complementary color to the wavelengths of the color reflected by the reflector.

The reflector may be a transflective reflector.

A plurality of the transflective reflectors may be provided on the side of the face, on which the opposed electrode is not formed, of the first substrate.

The reflector in each example described above can be also made so as to demonstrate a reflection characteristic different between at a region where the scattering characteristic and the transmission characteristic are controlled and at a region where the scattering characteristic or the transmission characteristic is always demonstrated, by applying a voltage to the liquid crystal layer of the light dispersed type liquid crystal cell through the opposed electrode and the signal electrode.

BEST MODE FOR CARRYING OUT THE INVENTION

The best mode of a liquid crystal display panel for a timepiece according to the present invention will be described hereinafter with reference to the accompanying drawings.

Example of the Structure of Liquid Crystal Display Panel for Timepiece

Now, various structural examples of the liquid crystal display panels according to the present invention will be shown in FIG. 1 through FIG. 12 and described.

Figure 1:
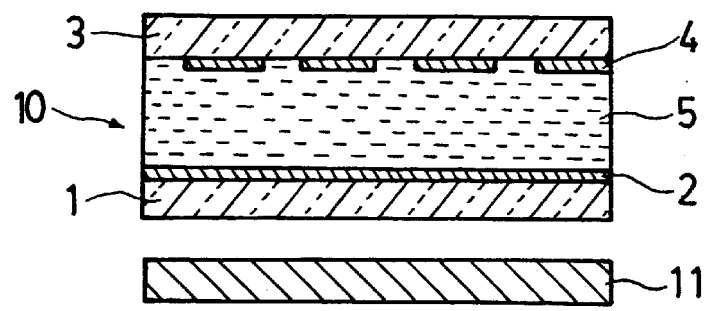
FIG. 1 to FIG. 12 are schematic sectional views partly showing the structures of different embodiments of a liquid crystal display panel for a timepiece according to the present invention.

In the liquid crystal display panel for a timepiece shown in FIG. 1, a light scattering type liquid crystal cell 10 is structured by respectively patterning an opposed electrode 2 on the inner surface of a first substrate 1 of a pair of transparent substrates and a signal electrode (a display electrode) 4 on the inner surface of a second substrate 3, and sealing a liquid crystal layer 5 containing a liquid crystal and a polymer material between the first substrate 1 and the second substrate 3 to form pixel portions at intersections between the signal electrode 4 and the opposed electrode 2. It should be noted that there is a sealant between the first substrate 1 and the second substrate 3 surrounding the substrates, but this drawing is shown by enlarging part of the liquid crystal display panel, thus the sealing material is not shown.

The liquid crystal display panel for a timepiece is structured by placing a reflector 11 on the side, on which the opposed electrode 2 is not formed, of the first substrate 1 constituting the light scattering type liquid crystal cell 10.

The liquid crystal layer 5, containing a liquid crystal and a polymer material, of the light scattering type liquid crystal cell 10 is a light scattering type liquid crystal, in which a liquid crystal and a monomer having a photo-polymerization property are mixed, made by photo-polymerizing a monomer having a photo-polymerization property by applying the light having a wavelength of 400 nm or less.

In the above structure, the alignment state of the liquid crystal between the electrodes (a pixel) is changed by applying a voltage between the opposed electrode 2 and the signal electrode 4, to indicate a digital display of time information and calendar information.

Moreover, the light made incident on the liquid crystal layer 5 scatters forward and rearward, the front scattering component is reflected by the reflector 11 placed under the light scattering type liquid crystal cell 10 to return into the liquid crystal layer 5 and is thus scattered therein, and the back scattering component becomes a redundant scattered light, resulting in a background for indicating digital display of time information, calendar information, and hands.

Figure 2:
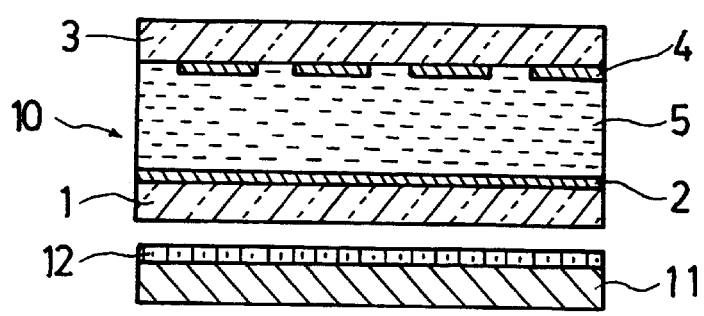

The liquid crystal display panel for a timepiece shown in FIG. 2 is made to be capable of color display by providing a color film 12 with a low scatterability on the upper face of the reflector 11 in FIG. 1.

Figure 3:
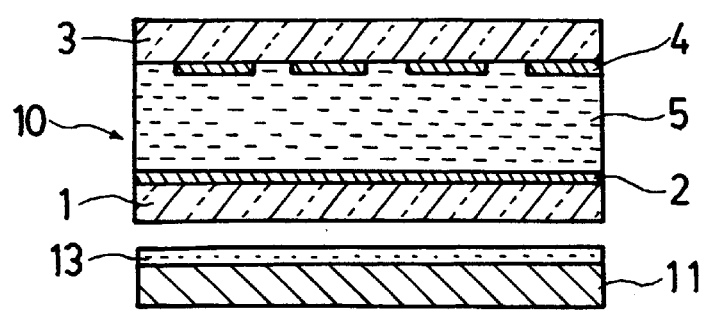

The liquid crystal display panel for a timepiece shown in FIG. 3 is provided with a light-accumulating source 13 having elements for absorbing light energy and emitting light in different wavelengths on the upper face of the reflector 11 in FIG. 1. The light-accumulating source 13 may be provided on the side opposite to the first substrate 1 with respect to the reflector 11 or in the liquid crystal layer 5, not limited between the first substrate 1 and the reflector 11.

Figure 4:
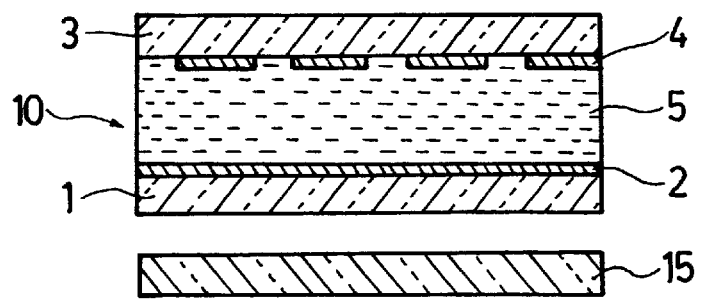

The liquid crystal display panel for a timepiece shown in FIG. 4 employs a reflector 15 for transmitting a portion of light as a reflector. The employment facilitates a color display and also enables a transmission-type display.

Figure 5:
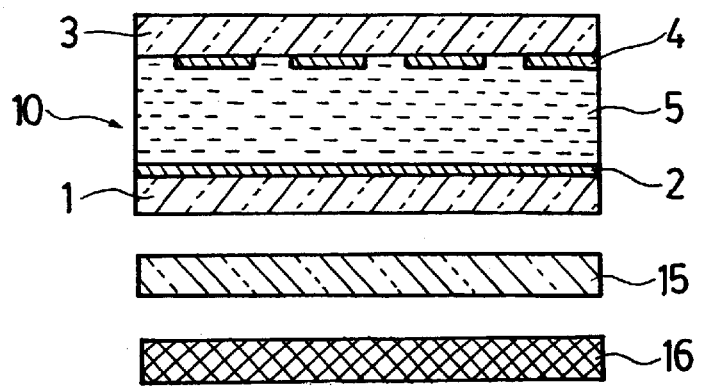

The liquid crystal display panel for a timepiece show in FIG. 5 is provided with a light absorption film 16 on the side opposite to the first substrate 1 with respect to the reflector 15 in FIG. 4. The provision improves contrast in a reflection-type display.

Figure 6:
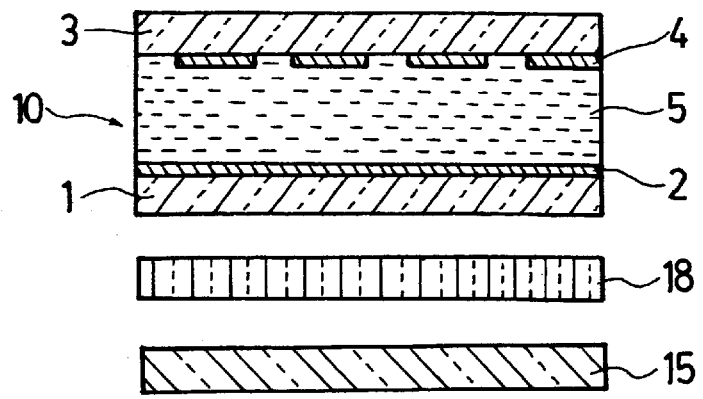

The liquid crystal display panel for a timepiece shown in FIG. 6 is provided with a color filter 18 on the first substrate 1 side with respect to the reflector 15 for transmitting a portion of light to enable a color display. The color filter 18 may be provided on the opposite side to the first substrate 1 with respect to the reflector 15.

Figure 7:
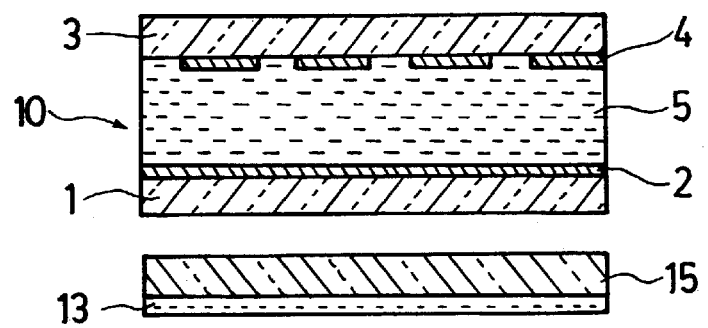

The liquid crystal display panel for a timepiece shown in FIG. 7 is provided with a light-accumulating source 13 having elements for absorbing a light energy and emitting a light in different wavelengths on the side opposite to the first substrate 1 with respect to the reflector 15 for transmitting a portion of light.

Figure 8:
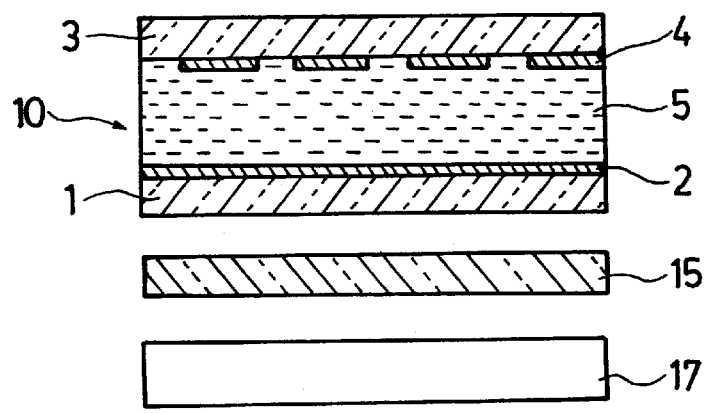

The liquid crystal display panel for a timepiece shown in FIG. 8 is provided with an auxiliary light source (a backlight) 17 on the side opposite to the first substrate 1 with respect to the reflector 15 to enable a transmission-type display also at a place with little or no ambient light.

Figure 9:
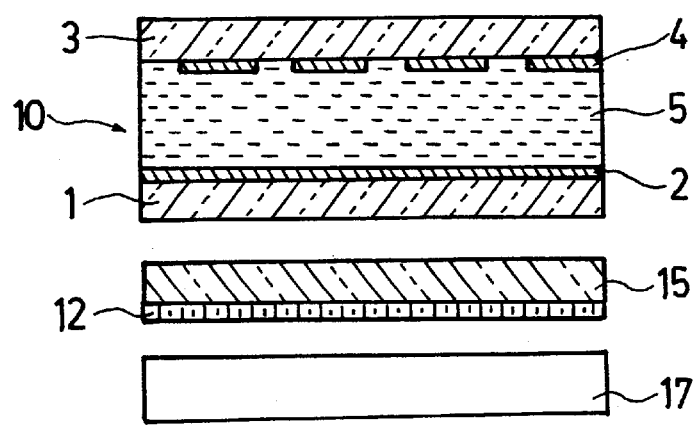

The liquid crystal display panel for a timepiece shown in FIG. 9 is provided with a color film 12 with a low scatterability between the reflector 15 and the auxiliary light source 17 in FIG. 8. The color film 12 may be provided between the reflector 15 and the first substrate 1.

Figure 10:
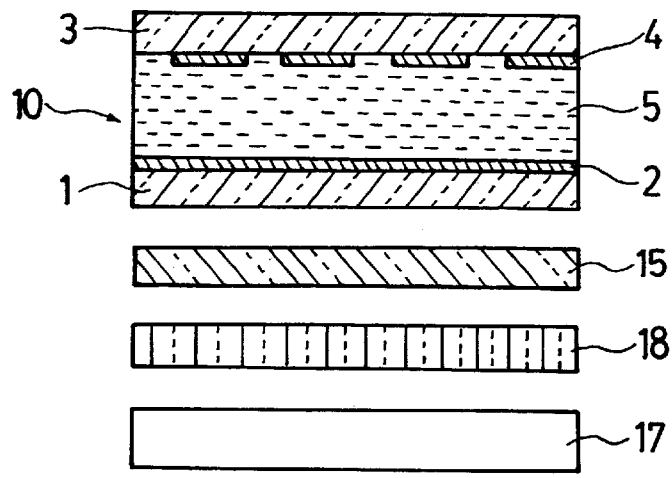

The liquid crystal display panel for a timepiece shown in FIG. 10 is provided with a color filter 18 between the reflector 15 and the auxiliary light source 17. The color filter 18 may be provided between the reflector 15 and the first substrate 1.

Figure 11:
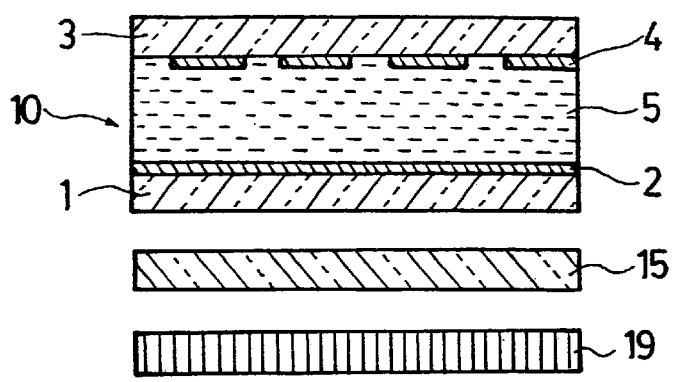

The liquid crystal display panel for a timepiece shown in FIG. 11 employs, as the reflector 15, a reflection-type polarizing film which transmits the light linearly polarized in the direction parallel to the transmission axis and reflects the light linearly polarized in the direction orthogonal to the transmission axis.

Moreover, it is preferable to provide a polarizing film 19 on the first substrate 1 side or on the side opposite thereof with respect to the reflection-type polarizing film 15 in such a manner that the transmission axis of the polarizing film 19 and that of the reflection-type polarizing film 15 are nearly parallel or orthogonal to each other.

Figure 12:
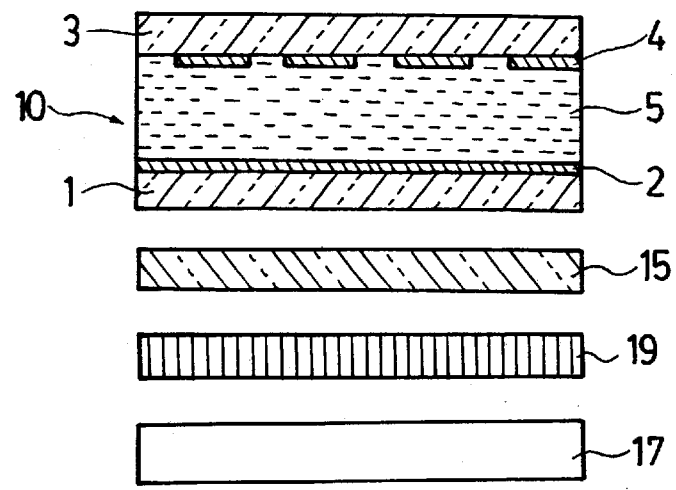

The liquid crystal display panel for a timepiece shown in FIG. 12 is provided with an auxiliary light source 17 at the outermost position on the side opposite to the visible side of the light scattering type liquid crystal cell 10 in FIG. 11.

In these liquid crystal display panels for timepieces, it is preferable to use a reflection-type polarizing film having a reflectance different in response to the wavelength within the visible light region when a reflection-type polarizing film is used as the reflector 15.

The reflector 15 may be a reflector which selectively reflects the light having a certain wavelength in the visible light and transmits the light having the other wavelengths.

The auxiliary light source 17 is preferably a light source having a light emission characteristic of the complementary color to the wavelength of the color reflected by the reflector 15.

The reflector 15 may be replaced with a transflective reflector.

A plurality of the transflective reflector may be provided on the side, on which the opposed electrode 2 is not formed, of the first substrate 1.

The reflector 11 or 15 in each example can be also made so as to demonstrate a reflection property different between at a region where the scattering characteristic and the transmission characteristic are controlled and at a region where the scattering characteristic or the transmission characteristic is always demonstrated, by applying a voltage to the liquid crystal layer 5 of the light scattering type liquid crystal cell 10 through the opposed electrode 2 and the signal electrode 4.

Example of Timepiece Employing the Present Invention

Hereinafter, embodiments of timepieces employing the liquid crystal display panels according to the present invention will be described.

Figure 13:
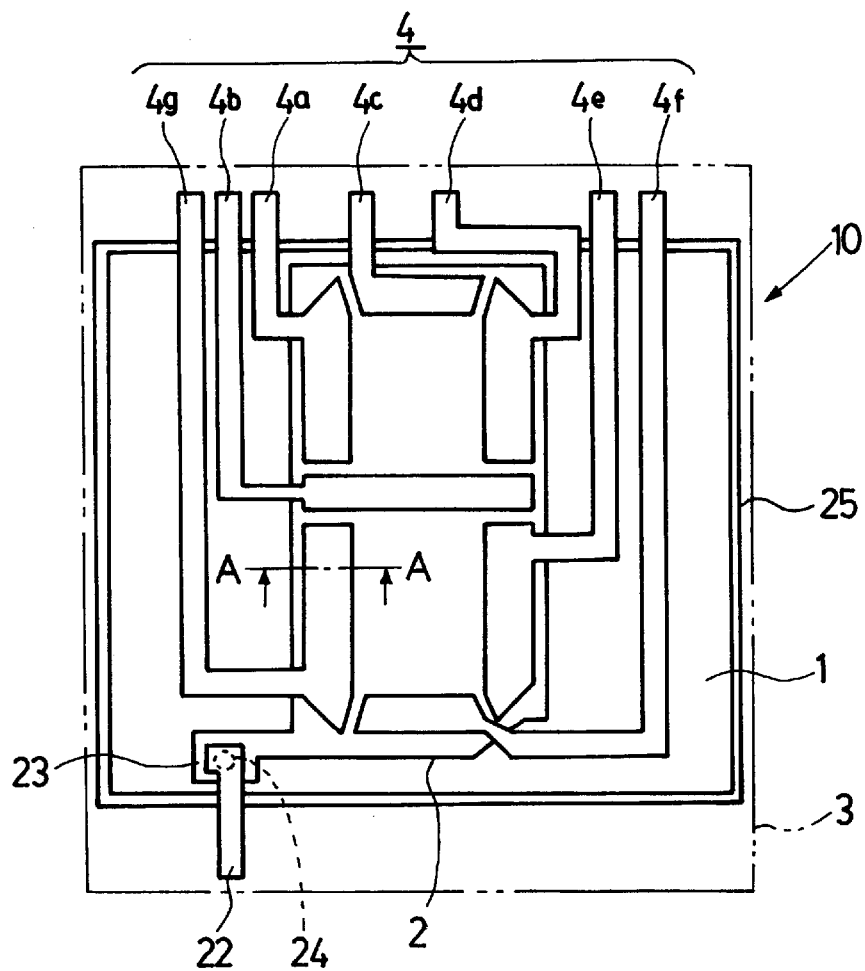
FIG. 13 is a plane view of the liquid crystal display panel for a timepiece for one letter, showing the concrete embodiment of the present invention.
Figure 14:
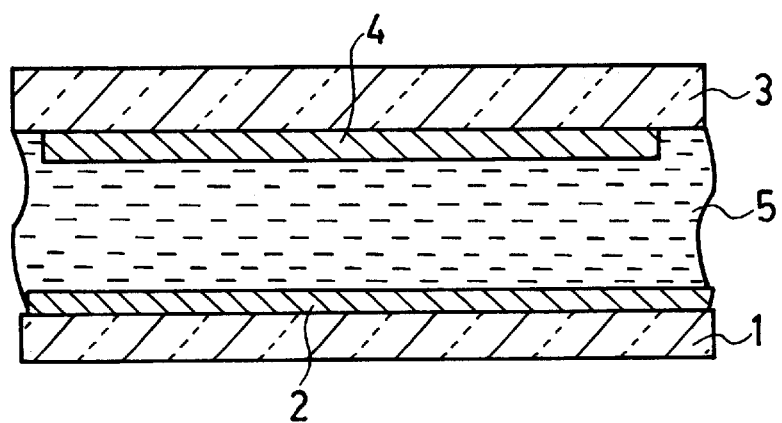
FIG. 14 is a sectional view along the A—A line in FIG. 13.
Figure 15:
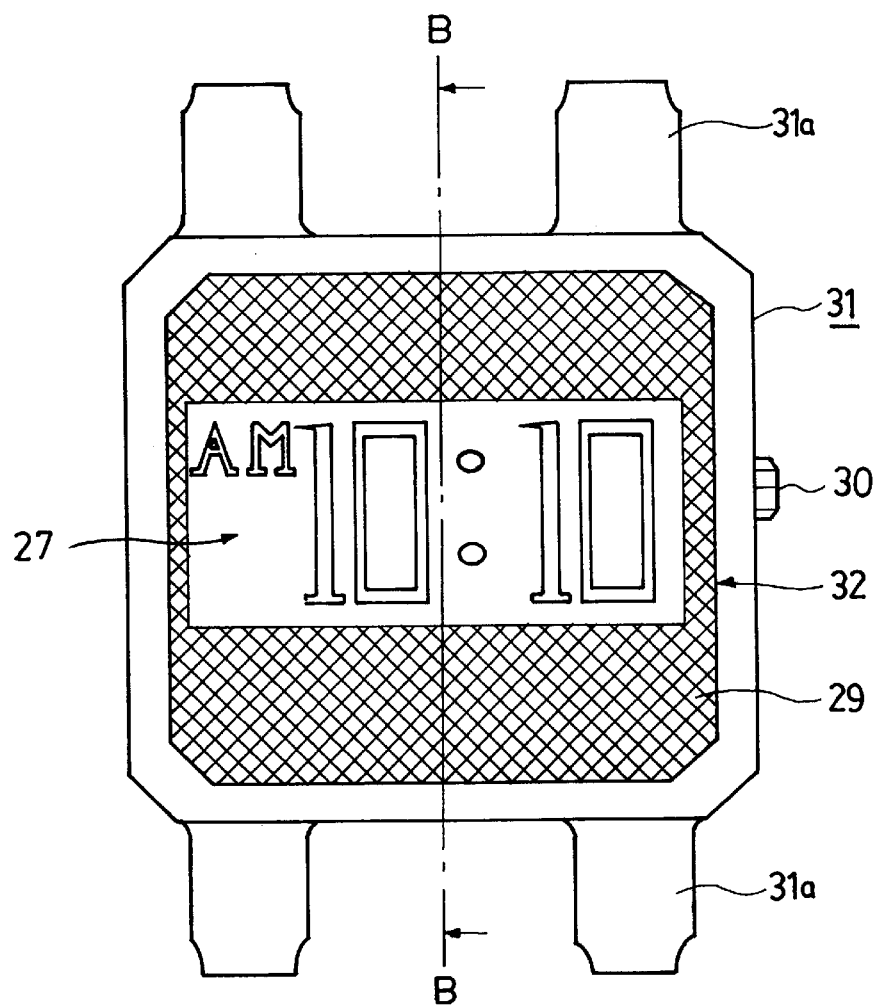
FIG. 15 is a schematic plane view of a timepiece employing the liquid crystal display panel for a timepiece according to the present invention.
Figure 16:
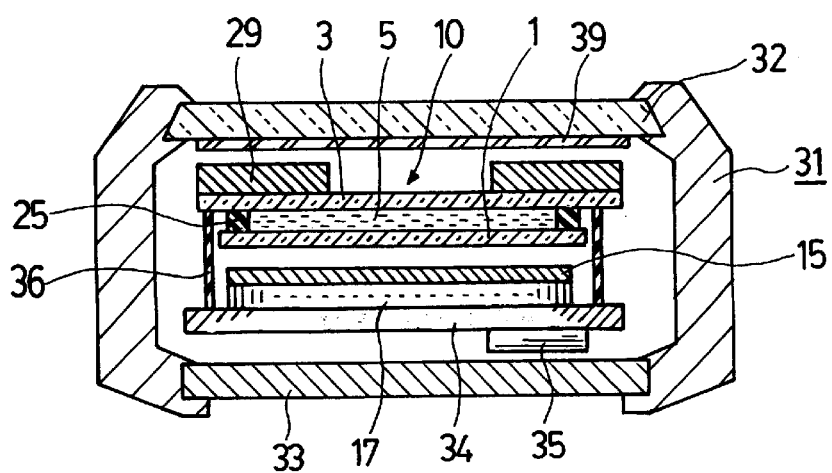
FIG. 16 is a schematic sectional view along the B—B line in FIG. 15.

FIG. 13. is a plane view showing the structure of the liquid crystal display panel for one letter part. FIG. 14 is a sectional view of the liquid crystal display panel along the A—A line in FIG. 13. FIG. 15 is a schematic plane view showing an example using the liquid crystal display panel capable of displaying a plurality of letters by the liquid crystal display panel shown in FIG. 13 to a watch. FIG. 16 is a schematic sectional view along the B—B line in FIG. 15.

The liquid crystal cell 10 of the liquid crystal display panel shown in FIG. 13 has a first substrate 1 provided on the lower side surface of the paper and a second substrate 3 provided on the upper side surface of the paper. On the first substrate 1, an opposed electrode 2 made of indium tin oxide (ITO) film is formed as transparent conductive film. Seven-part split segment electrodes 4a to 4g as a signal electrode 4 are provided on the second substrate 3 opposed to the first substrate 1 having a predetermined gap therebetween. The seven-part split electrodes 4a to 4g enables display for numbers and the like.

Moreover, a connecting electrode 22 for electrically transferring the opposed electrode 2 onto the second substrate 3 is provided on the second substrate 3. The opposed electrode 2 on the first substrate 1 is provided having a shape of region to cover the signal electrode 4 provided on the second substrate 3. Furthermore, the opposed electrode 2 is connected to the connecting electrode 22 on the second substrate 3 at a connecting portion 23 connecting with the opposed electrode 2 by adhesives and a conductive particle 24.

A liquid crystal layer 5 containing a polymer monomer in a liquid crystal is injected between the first substrate 1 and the second substrate 3, and then is exposed with ultraviolet ray from the second substrate 3 side so as to be a polymer material. The liquid crystal layer 5 is sealed by the first substrate 1, the second substrate 3, a sealing material 25, and an end-sealing material (not shown). An alignment film for systematically aligning a liquid crystal is not provided on the first substrate 1 and the second substrate 3. In a experiment where a polymer monomer in a liquid crystal is subjected to a crosslinking reaction to be a polymer material by an ultraviolet ray, or in a shelf test, an alignment film has peeled off from substrates resulting in unevenness in display, therefore no alignment film is used in this embodiment.

An embodiment using the liquid crystal display panel having the aforesaid structure to a watch will be described using FIG. 15 and FIG. 16.

A case 31 of this watch has a glass 32 and a case back 33. From the glass 32 side, the second substrate 3, the liquid crystal layer 5, the sealing material 25, and the first substrate 1 are placed. Under the first substrate 1 (on the case back side), an electro-luminescent (EL) light is installed as an auxiliary light source 17. Moreover, a circuit board 34 for driving the liquid crystal display panel and a zebra-rubber connector 36 in which conductive part and nonconductive part are repeatedly laminated into stripes for electrically connecting the circuit board 34 and the liquid crystal display panel, are placed.

In addition to the electro-luminescent (EL) light, a light emitting diode (LED) device, a cold-cathode tube, or a hot-cathode tube may be used as the auxiliary light source 17.

Under the lower surface (the rear face) of the first substrate 1, a reflection-type polarizing film 15 is placed as a reflector. The reflection-type polarizing film 15 has a polarization characteristic in one optical axis and a reflection characteristic in the optical axis orthogonal to the aforesaid optical axis. As the reflection-type polarizing film 15, an optical film DBEF (trade name) manufactured by Sumitomo 3M Ltd. is used in reality.

In the liquid crystal display panel using a polymer material, a scattering characteristic is changed into a transmission characteristic depending on a voltage applied to the liquid crystal layer 5. Therefore, the light from an external light source made incident on the transmission part is strongly emitted out by reflection by the reflection-type polarizing film 15 and the light from the external light source is weakly emitted out at the scattering part, thereby enabling display while the auxiliary light source 17 is turned off. The transmission part strongly transmits the light from the auxiliary light source 17 and the scattering part weakly transmits it, thereby realizing display with high contrast while the auxiliary light source 17 is turned on.

On the other hand, when the watch is used in a circumstance where the auxiliary light source 17 is unnecessary, use of a light absorption layer (not shown) in place of the auxiliary light source 17 can improve its visibility.

It is found by experiment that a watch is normally used by the observer at an angle of nearly 0° to 30° with respect to the vertical axis of the display portion of the watch when the observer reads the time. Moreover, a contrast ratio between the scattering part and the transmission part (reflection by the reflection-type polarizing film 15) of the liquid crystal display panel has been obtained from components nearly regularly reflected by the reflection-type polarizing film 15 placed under the rear face of the first substrate 1.

The above is a unique characteristic of a watch because the display portion of the watch is small in area compared to, for example, display for a notebook-type personal computer, and because the watch is worn on an arm.

Furthermore, by turning on the EL which is the auxiliary light source 17, light emission strength of the auxiliary light source 17 to the observer (the glass 32 side) becomes naturally higher at the transmission part compared with that at the scattering part. In other words, there occurs a difference in light strength between at the scattering part and at the transmission part, thus letters can be recognized. By ON/OFF of lighting of the auxiliary light source 17, display is reversed from the transmitted light to the reflected light, resulting in display with attractive design as a watch. The positive/negative reverse display is not effective in a typical liquid crystal display panel, for instance, on a screen of a personal computer because colors and brightness vary in appearance. However, concerning a watch, time display is its principal purpose, thus it needs short time for recognition of the liquid crystal display panel. Furthermore, the period of time when the auxiliary light source 17 is turned on is short, thus providing a variation in display to contribute to improvement of design in appearance.

A battery 35 is installed at a part of the circuit board 34 as an energy supply source to the circuit board 34. As shown in FIG. 15, display of morning and afternoon, and display of hours and minutes can be indicated by display 27 of the liquid crystal display panel. Moreover, the watch has a setting-terminal input portion 30 for adjusting the time and the like.

On the glass 32 side of the second substrate 3, a shielding plate 29 provided with a display aperture to prevent a light being incident on a connecting portion between the second substrate 3 and the circuit board 34 and the sealing material 25 or the transmission part of an ambient light. Furthermore, on the second substrate 3 side of the glass 32, an ultraviolet-ray preventing sheet 39 is provided to prevent the liquid crystal layer 5 from decomposing and deteriorating due to the ultraviolet ray. That is for processing of the shielding plate 29 and to prevent the liquid crystal layer 5 from deteriorating due to bonding process of the ultraviolet-ray preventing sheet 39 by providing the ultraviolet-ray preventing sheet 39 on the glass 32.

As is clear from the above explanation, when there is a incident light from an external light source from the glass 32 side of the watch, the incident light passes through the glass 32 of the watch, the second substrate 3, and the liquid crystal layer 5, and thereafter through the first substrate 1 and a spaced gap, to reach the reflection-type polarizing film 15. At the transmission part, the incident light is strongly reflected by the reflector 15 and emitted out to the observer side. Conversely, at the scattering part, the incident light is scattered by passing through the second substrate 3 and the liquid crystal layer 5, and thereafter through the liquid crystal layer 5, the second substrate 3, and the glass 32 to reach the user of the watch in a weak reflected light. As described above, the information from the circuit board 34 is supplied from the signal electrode 4 on the second substrate 3 to the opposed electrode 2 to indicate a predetermined display, thereby providing the information to the observer of the watch by an optical difference between the scattering part and the transmission part.

Conversely, when the incident light from the external light source is weak in strength, the light from the EL light which is the auxiliary light source 17 of the watch passes through the first substrate 1, the liquid crystal layer 5, the second substrate 3, and the glass 32 to be emitted out to the observer side, at the transmission part. At the scattering part, the light is made incident on the first substrate 1 and the liquid crystal layer 5 is scattered by the liquid crystal layer 5, thus the light emitted out to the second substrate 3 or to the observer is very weak, resulting in that the observer can recognize information by the transmission part and the scattering part. Making the EL light in a primary color improves visibility. Additionally, the EL light is made a yellow tone to be a golden tone, thereby giving a higher-grade appearance to the watch.

In the aforesaid embodiment, though the structure in which a predetermined gap is provided between the first substrate 1 and the reflector 15 has been explained, a light-accumulating source made of a phosphorescent material can be provided on the reflector 15.

As the phosphorescent material, for example, a material in which zinc sulfide (ZnS) is doped with the copper (Cu) family as a light emission center and further added with a sintered material ($K_2SiO_3$) of potassium oxide and silicon oxide to prevent darkening is used. Thereby, energy can be stored in the light-accumulating source through the mixed liquid crystal layer, therefore display can be recognized by utilizing light emission of the light-accumulating source when the watch is used in a dark circumstance.

When there is a transmission property in the reflector 15, the light-accumulating source can be placed without a change in reflectance of the reflector or in color tone by providing a light-accumulating source on the case back side of the reflector 15. Therefore, it is effective to place the light-accumulating source on the case back side of the reflector when the reflectance of the reflector or color tone is considered to be important.

The liquid crystal layer 5 is added with a phosphorescent material, thereby it wholly emits light, therefore though the contrast is lowered, it becomes effective when the watch is used in a dark circumstance. In particular, since the liquid crystal layer 5 contains a polymer material, contamination due to the phosphorescent material to the liquid crystal can be prevented by dispersing a phosphorescent material in the polymer material therefore the addition of a phosphorescent material becomes effective.

As has been described, a light-accumulating source absorbing a light energy and emitting a light is used to a watch, thereby improving visibility of the liquid crystal without increasing power consumption when the watch is used in a dark circumstance. Especially, it is very effective to use a light-accumulating source, not using a polarizing film, in a scattering type mixed liquid crystal layer in which transmittance of the scattering part thereof is comparatively made high, because the light-accumulating source is bright in spite of its low light emission strength.

Next, another embodiment of the watch employing the liquid crystal display panel for a timepiece according to the present invention will be described.

Figure 17:
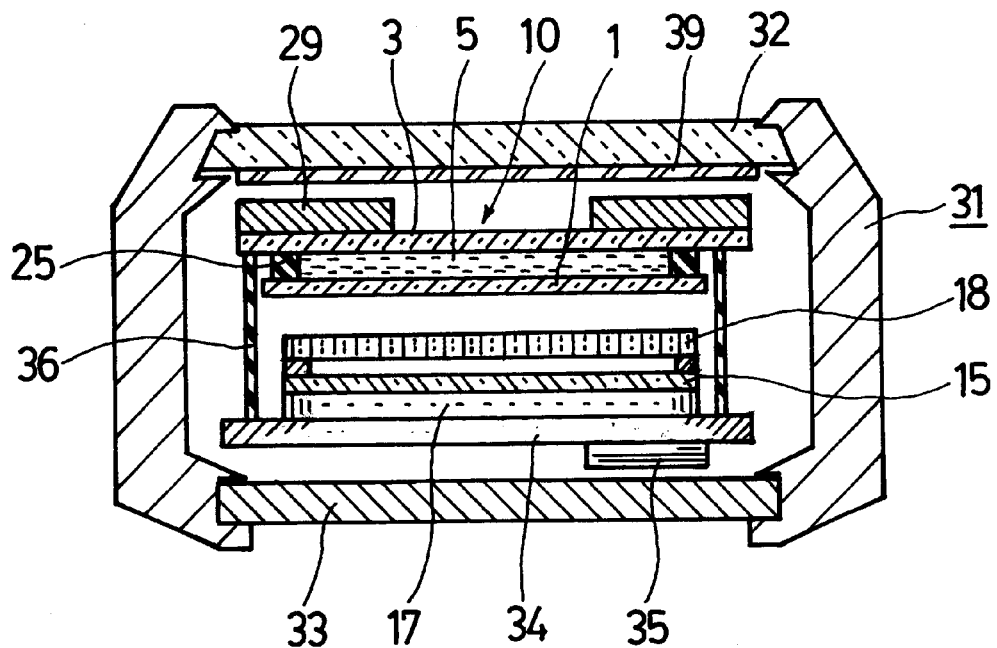
FIG. 17 is a sectional view, similar to FIG. 16, showing a partly modified example of FIG. 16.

FIG. 17 is a schematic sectional view along the B—B line in FIG. 15., in which a part of FIG. 16 is modified.

This liquid crystal display panel has a first substrate 1 provided at the lower side of the paper plane and a second substrate 3 provided at the upper side of the paper plane. A opposed electrode 2 made of indium tin oxide (ITO) film as transparent conductive film is provided on the first substrate 1. As shown in FIG. 13 and FIG. 14, seven-part split segment electrodes 4a to 4g as a signal electrode 4 are provided on the second substrate 3 opposed to the first substrate 1 having a predetermined gap therebetween.

In this watch, a color filter 18 is installed under the lower face (the rear face) of the first substrate 1 and a reflector 15 is placed under the color filter 18.

Moreover, an electro-luminescent (EL) light as an auxiliary light source 17 is placed under the lower face (the rear face) of the reflection-type polarizing film 15 as the reflector.

Alternatively, the reflection-type polarizing film 15 may be placed under the lower face (the rear face) of the first substrate 1 as a reflector, and the color filter 18 may be installed under the lower face of the reflection-type polarizing film 15. In this case, colors by the color filter 18 can be seen while the auxiliary light source 17 is turned on.

In place of the color filter 18, a color polarizing film (not shown) may be installed, provided that the reflection axis of the reflection-type polarizing film 15 and the absorption axis of the color polarizing film are arranged to be parallel or orthogonal to each other.

As is clear from the above explanation, when there is an incident light from an external light source from a glass 32 side of the watch, the incident light passes through the glass 32 of the watch, the second substrate 3, and the liquid crystal layer 5, and thereafter through the first substrate 1, the color filter 18, and a spaced gap to reach the reflector 15. At the transmission part, the incident light is strongly reflected by the reflector 15 and colored by the color filter 18, and then returns to be emitted out to the observer side, resulting in a color display. Conversely, at the scattering part, the incident light is scattered by passing through the second substrate 3 and the liquid crystal layer 5, and thereafter through the liquid crystal layer 5, the second substrate 3, and the glass 32 to reach the user of the watch in a weak reflected light.

As described above, the information from a circuit board 34 is supplied from the signal electrode 4 on the second substrate 3 to the opposed electrode 2 to indicate predetermined display, thereby providing the information to the observer of the watch by an optical difference between the scattering part and the transmission part.

Conversely, when the incident light from the external light source is weak in strength, the light from the EL light which is the auxiliary light source 17 of the watch passes through the color filter 18, the first substrate 1, the liquid crystal layer 5, the second substrate 3, and the glass 32 to be emitted out to the observer side, at the transmission part. At the scattering part, the light is made incident on the color filter 18, the first substrate 1, and the liquid crystal layer 5 is scattered by the liquid crystal layer 5, thus the light emitted out to the second substrate 3 or to the observer is very weak, resulting in that the observer can recognize information by the transmission part and the scattering part. By making the color of the EL light the same as that of the color filter 18, color display can be indicated without loss of lumminance of the EL light, therefore design in appearance is improved. Additionally, the color filter 18 and the EL light are made a yellow tone to be a golden tone, thereby giving a higher-grade appearance to the watch.

Next, still another example of the watch employing the liquid crystal display panel according to the present invention will be described.

In this embodiment, the liquid crystal display panel comprising a liquid crystal layer 5 containing a polymer material is placed on the case back side of hands (an hour hand and a minute hand). Placement of an ultraviolet-ray preventing sheet 39 of the liquid crystal display panel and an auxiliary light source 17 is considered to provide the hands.

This is an example in which a liquid crystal display panel of an M by N matrix type is made by providing M signal electrodes and N opposed electrodes, so that display by the liquid crystal display panel can be indicated on the entire surface of a time display part of the watch.

In the matrix type liquid crystal display panel, an intersection of each signal electrode (not shown) and opposed electrode (not shown) becomes each pixel portion. There are an active-matrix type having a switching element in each pixel portion, and a passive-matrix type without a switching element. This embodiment is effective for both types, and the passive-matrix type is employed for explanation.

By using the passive-matrix type, display with higher quality can be indicated, compared to that of the first embodiment.

Figure 18:
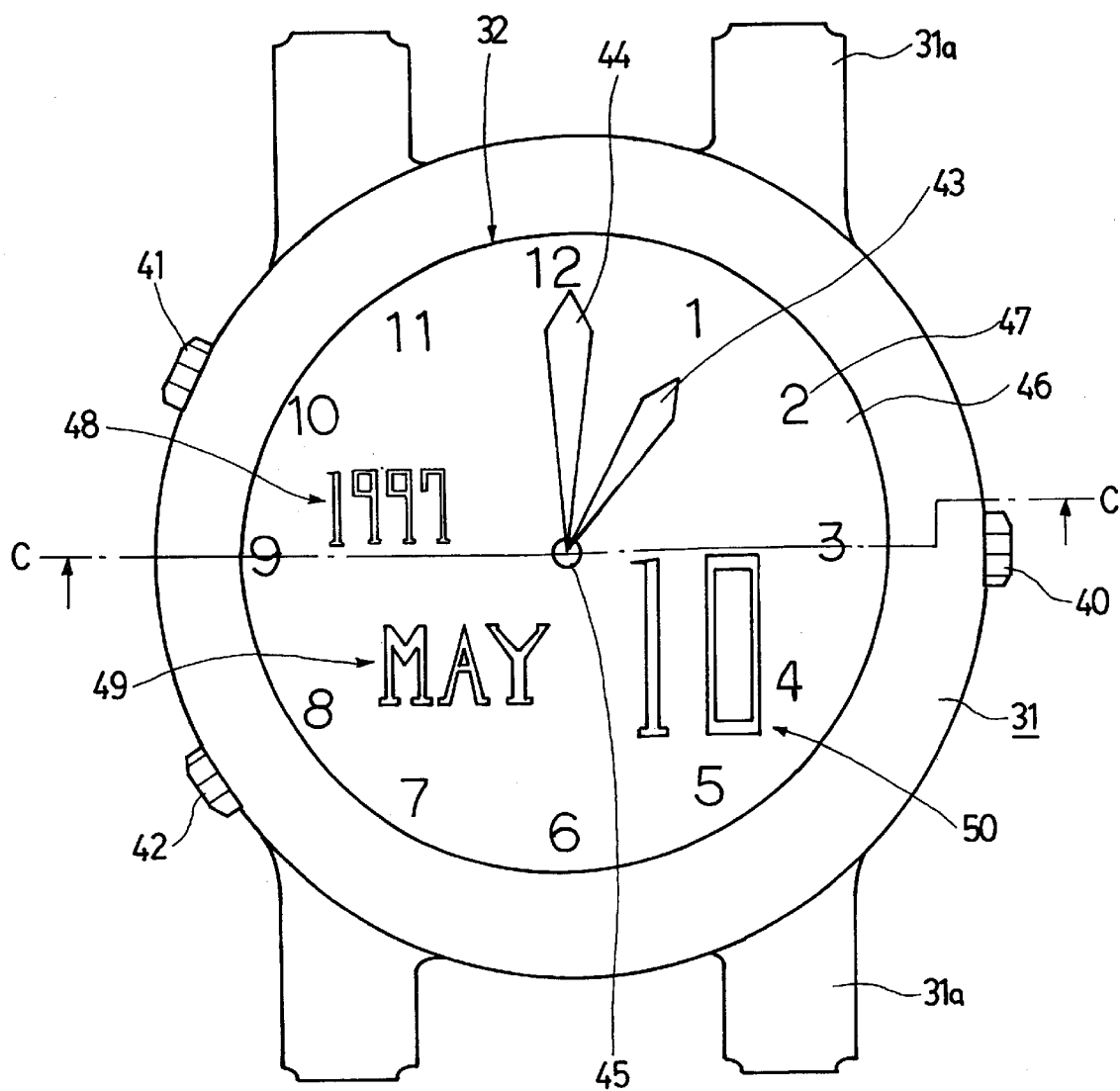
FIG. 18 is a schematic plane view of another timepiece employing the liquid crystal display panel according to the present invention.
Figure 19:
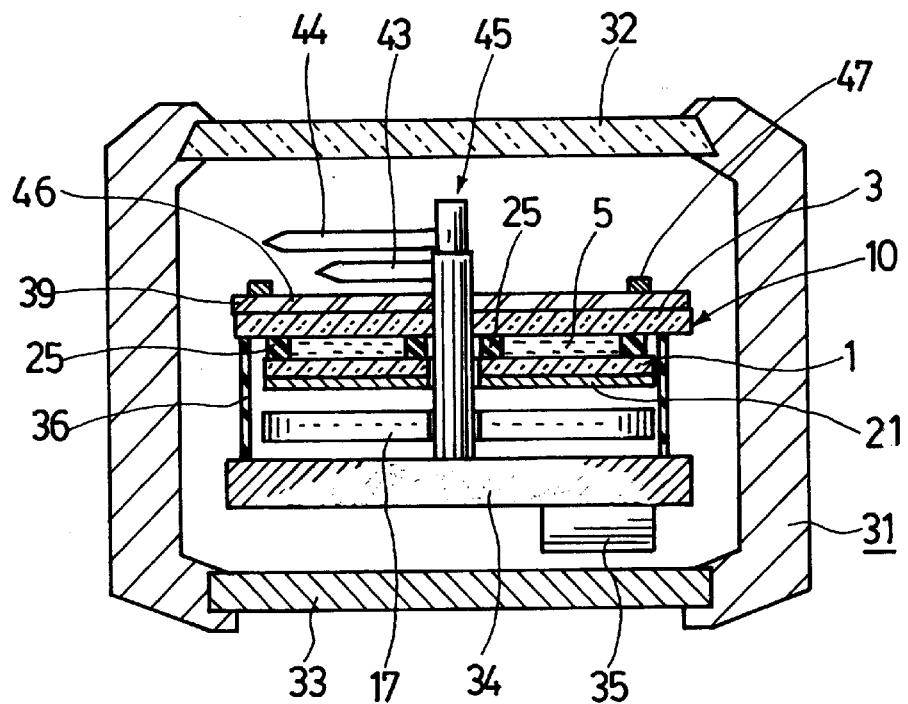
FIG. 19 is a schematic sectional view along the C—C line in FIG. 18: a schematic sectional view of a timepiece in a third embodiment of the present invention.

FIG. 18 is a schematic plane view of a combination-type watch comprising a digital display using the liquid crystal display panel according to the present invention and an analog display having a minute hand and an hour hand. FIG. 19 is a schematic sectional view along the C—C line in FIG. 18.

The liquid crystal display panel of this watch has a first substrate 1 provided at the lower side of the paper plane and a second substrate 3 provided at the upper side of the paper plane. A plurality of opposed electrodes made of N stripe electrodes are provided on the first substrate 1, and a plurality of signal electrodes are provided, taking the form of M stripe electrodes, on the second substrate 3 opposed to the first substrate 1 having a predetermined gap therebetween.

In a case of a watch, installation volume capacity for electrically connecting a circuit board 34 and the liquid crystal display panel is strictly limited. Accordingly, the opposed electrode in stripe form on the first substrate 1 is electrically transferred onto the second substrate 3 by mixing a conductive particle (not shown) in a sealing material 25 and through the conductive particle and a connecting electrode in stripe form provided on the second substrate 3. Employment of the above structure allows the circuit board 34 to be implemented on one face with respect to the liquid crystal display panel, thus making installation volume capacity quite small.

The sealing material 25 is provided around the first substrate 1 in a gap between the first substrate 1 and the second substrate 3, a liquid crystal layer 5 containing a liquid crystal and a polymer monomer is injected into the spaced gap and thereafter an injection port is sealed with an end-sealing material.

A watch case 31 of this watch has a glass 32 and a case back 33. From the glass 32 side, the second substrate 3, the liquid crystal layer 5, the sealing material 25, and the first substrate 1 are placed. A shaft 45 for driving a minute hand 44 and an hour hand 43 of an analog watch pierces the center of the liquid crystal display panel. Moreover, on the lower face (the case back 33 side) of the first substrate 1, a color reflector 21 for reflecting the light having a specific wavelength in visible light, or translucent film formed by making gold (Au) into film to be 15 nm in thickness to obtain a golden color tone, is used as a reflector. As the color reflector 21, for example, used is a reflection-type polarizing film having a reflection characteristic which is especially high in a specific wavelength, not a reflection characteristic which is uniform in the entire wavelength region of visible light. For instance, the above polarizing film can be formed by removing layers regarding specific wavelengths from the reflection-type polarizing film consisting of multi-layered structure to obtain a reflection property which is uniform in the entire wavelength region of visible light.

At the lower position under the first substrate 1, an EL is placed as the auxiliary light source 17 and the color polarizing film 21 and the EL are similarly provided with through holes. The peripheries of the through holes of the color polarizing film 21 and the EL are sealed with a sealing material 25 to thereby reinforce mechanical strength. The EL light is turned on by a control signal from a lighting button 42. The EL is connected to the circuit board 34 through an EL connecting line (not shown).

The circuit board 34 having a power source circuit of a mechanical driving portion for driving an analog watch portion and a digital circuit portion for driving the liquid crystal display panel, and a battery 35, are provided under the EL.

A dial 46 having time indicating numbers 47 of the analog watch, in addition to controlling an ultraviolet ray made incident on the liquid crystal layer 5 and a reflected light, is provided on the second substrate 3 of the liquid crystal display panel. It is an effective method that the dial 46 also serves as an ultraviolet-ray shielding film for the liquid crystal layer 5, for a thing which is severely limited in thickness as a watch.

The circuit board 34 and the liquid crystal display panel are electrically connected to each other by a zebra-rubber connector 36 in which a conductive material and a nonconductive material, both in stripe shape, are repeatedly laminated.

As shown in FIG. 18, there are a mode switching button 41 for changing mode of a year display 48, a month display 49, and a date display 50 by the liquid crystal display panel, and a setting-terminal input portion 40.

Moreover, as shown in FIG. 19, an ultraviolet-ray preventing sheet 39 is provided on the glass 32 side of the second substrate 3 to prevent irradiation of the ultraviolet ray to the liquid crystal layer 5. Furthermore, time indicating numbers 47 for the analog watch and a shielding plate (not shown) to shield a processed edge of the liquid crystal display panel, the sealing material 25, are provided on the ultraviolet-ray preventing sheet 39.

In this embodiment, it is effective to use an M by N matrix-type liquid crystal display panel to change positions of display letters of the liquid crystal display panel, and to use a matrix-type liquid crystal display panel with high density for a display portion to make the ratio between the transmission part and the scattering part around the transmission part into 1-to-2 or more scattering part.

The ultraviolet-ray preventing sheet 39 with non-reflection treatment is provided on the liquid crystal display panel to increase direct incident light into the transmission part of the liquid crystal display panel through the glass 32 and to prevent reflection on the glass 32 or on the second substrate 3 while the auxiliary light source 17 is turned off. Thereby, the ratio between the scattering part and the transmission part (the reflection part), that is, the contrast ratio can be made large by increasing reflection strength at the transmission part and preventing unintended reflection of light.

As is clear from the above explanation, by virtue of the combination of the liquid crystal layer 5 containing a liquid crystal and a polymer material and the color reflector 21, display with high contrast becomes possible utilizing a difference in light strength between at the transmission part and at the scattering part of the liquid crystal display panel in a circumstance where light is made incident from the glass 32 side.

Moreover, it is effective for improvement in display quality that the glass 32 or the components over the color reflector 21 are subjected to reflection-preventing processing because the reflection ratio between at the transmission part (the reflection part) of the liquid crystal display panel and at the other components can be increased.

Furthermore, provision of a difference in reflectance of the color reflector 21 in a visible light region enables a color display by using the transmission part of the liquid crystal display panel. More specifically, a wavelength-selecting reflection film made by a combination of a reflection-type polarizing film and a color filter or a color film, or a combination of a color filter and a thin film metal layer, is used.

The emitting wavelength of the auxiliary light source 17 and the transmitting wavelength region of the reflector 15 or the color polarizing film 21 are matched with each other, thereby effectively utilizing the light from the auxiliary light source 17.

Next, yet another embodiment of the watch employing the liquid crystal display panel according to the present invention will be described.

Figure 20:
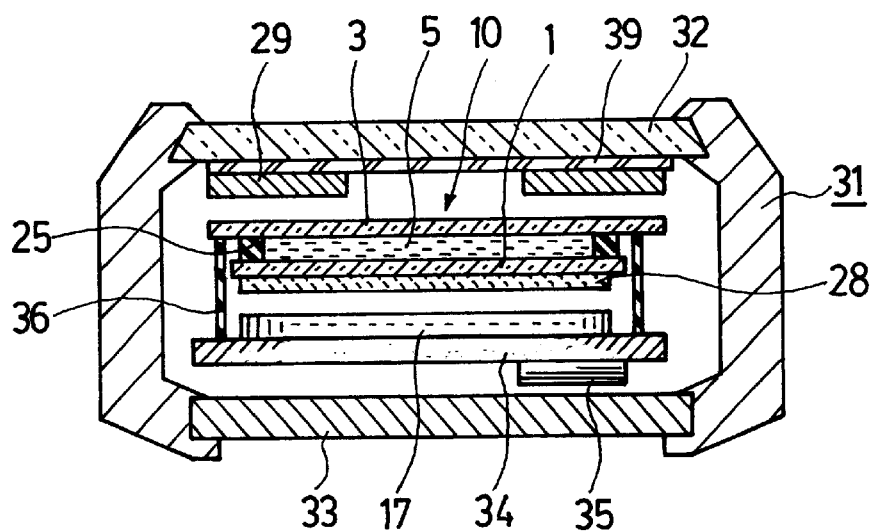
FIG. 20 is a schematic sectional view of still another timepiece employing the liquid crystal display panel for a timepiece according to the present invention.

FIG. 20 is a schematic sectional view showing the structure of the watch. FIG. 20 corresponds to a section along the B—B line in FIG. 15.

A watch case 31 of this watch has a glass 32 and a case back 33. On the case back 33 (the lower face) side of the glass 32, an ultraviolet-ray preventing sheet 39 with a reflection preventing treatment is provided. The other side is subjected to a reflection preventing treatment.

Under the glass 32, a second substrate 3, a liquid crystal layer 5, a sealing material 25, and a first substrate 1 are placed. Under the first substrate 1 (on the case back side), a circuit board 34 for driving the liquid crystal display panel is placed, and an electro-luminescent (EL) light is installed on the circuit board 34 as an auxiliary light source 17. Moreover, the circuit board 34 is electrically connected to the liquid crystal display panel by a zebra-rubber connector 36 in which a conductive material and a nonconductive material, both in stripe shape, are repeatedly laminated.

Moreover, on the case back (the rear face) side of the first substrate 1, a cholesteric liquid crystal film 28 for reflecting the light in a specific wavelength region and transmitting the other light, and the auxiliary light source 17 are placed. The wavelength region of the light which the cholesteric liquid crystal film 28 transmits and that of emitting light of the auxiliary light source 17 are matched with each other. A cholesteric liquid crystal film manufactured by Nippon Oil Co. Ltd. or a liquid crystal display panel in which a cholesteric liquid crystal is sealed in a plastic substrate, is used in reality.

Furthermore, the ultraviolet-ray preventing sheet 39 is provided on the case back (the lower face) side of the glass 32 and a shielding plate 29 is provided on the ultraviolet-ray preventing sheet 39, and additionally, the shielding plate 29 is kept away in distance from the glass 32. Thereby, the shielding plate 29 can limit an angle of light made incident on the liquid crystal cell 10 and an angle of light emitting out, which is regularly reflected by the cholesteric liquid crystal film 28, to the observer, thus an excellent display can be provided to the observer.

Next, the display principle of the liquid crystal display panel according to the present invention will be described using FIG. 21.

Figure 21:
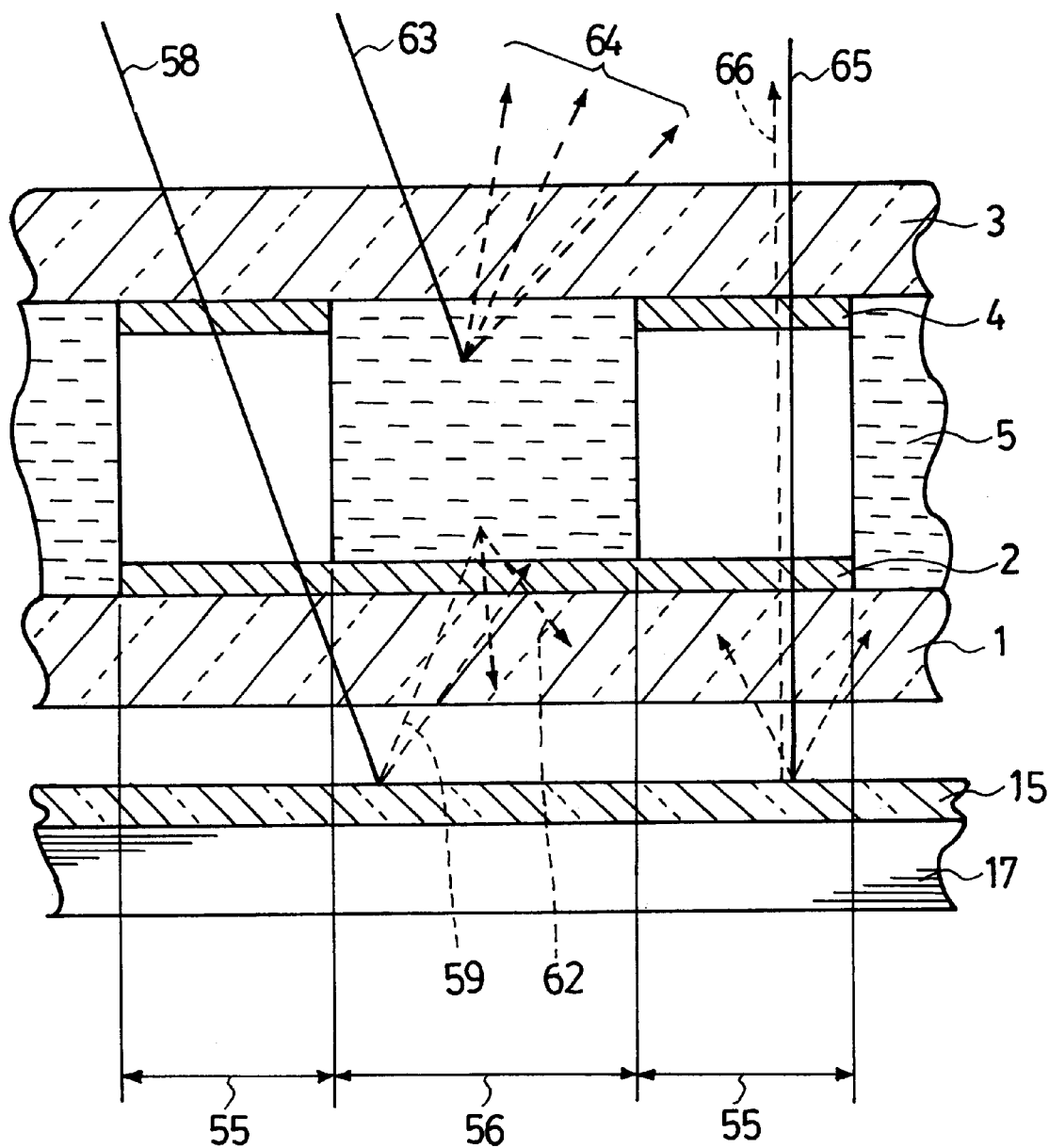
FIG. 21 is a schematic, partially enlarged sectional view for explaining display operations of the liquid crystal display panel for a timepiece according to the present invention.

FIG. 21 is a partially enlarged sectional view of the liquid crystal display panel. An opposed electrode 2 is provided on a first substrate 1. A signal electrode 4 overlapping the opposed electrode 2 is provided on a second substrate 3. There are a region (a pixel portion) 55 where the signal electrode 4 and the opposed electrode 2 overlap each other and a gap portion 56 between the signal electrodes 4.

There is an electro-luminescent (EL) light under the first substrate 1 as an auxiliary light source 17. Moreover, there is a reflection-type polarizing film 15 between the auxiliary light source 17 and the first substrate 1 as a reflector. The reflection-type polarizing film 15 is structured to adhere to the auxiliary light source 17.

A first incident light 58 is made incident from the glass (not shown) side of the second substrate 3. The first incident light 58 is made incident on the pixel portion 55 where the opposed electrode 2 and the signal electrode 4 overlap each other and passes through the liquid crystal layer 5 because the liquid crystal layer 5 demonstrates a strong transmission characteristic by virtue of the nearly same refractive indexes of its liquid crystal and polymer material. Thereafter the first incident light 58 becomes a strong regularly reflected light (a emitting-out light) 59 by the reflection-type polarizing film 15 provided on the auxiliary light source 17 and returns to be emitted out to the glass side. By regular reflection, the angles of the incident light 58 and the emitting-out light 59 with respect to the normal of the second substrate 3 become equal to each other. The incident light near the normal becomes a emitting-out light 62 in a direction nearly the same as that of the incident light 58 by the reflection-type polarizing film 15.

A second incident light 63 is made incident from the glass (not shown) side of the second substrate 3. The second incident light 63 is made incident on the gap portion 56 between the signal electrodes 4 and is scattered by the liquid crystal layer 5 to be a third scattering light 64 because the liquid crystal layer 5 demonstrates a scatterability due to a difference in refractive index between its liquid crystal and polymer material. The third scattering light 64 is scattered in a wide range to the glass side to reach the observer in a weak light.

A third incident light 65 is made incident perpendicularly on the pixel portion 55 where the opposed electrode 2 and the signal electrode 4 overlap each other, passing through the liquid crystal layer 5, and becomes a strong regularly reflected light by the reflection-type polarizing film 15 to be a emitting-out light 66 returning to be emitted out to the glass side.

As has been described, regarding a incident light from an external light source, an excellent display becomes possible by virtue of a difference between a transmittability and a scatterability of the liquid crystal layer 5 and a difference between strong light returned to the observer by utilizing reflected light from the reflector 15 provided under the pixel portion 55 demonstrating the transmittability and the weak light from a portion demonstrating the scatterability.

Moreover, when the watch is used in a dark circumstance, the light from an external light source is very weak, therefore the light from the auxiliary light source 17 is emitted out to the observer in strong light at the pixel portion 55 with the transmittability of the liquid crystal layer 5 and is returned to the auxiliary light source 17 side to be the weak light at the portion with the scatterability. Accordingly, display with enough visibility becomes possible at the transmission part and the scattering part even during use of the auxiliary light source 17.

Industrial Applicability

As has been described, the liquid crystal display panel for a timepiece according to the present invention has a simple structure, in which a light scattering type liquid crystal cell for indicating a display by controlling a dispersion property and a transmittability by an applied voltage utilizing a difference in refractive index between a liquid crystal and a polymer material as a liquid crystal layer, is used with a reflector, thereby obtaining an excellent contrast ratio by the strong reflected light from the reflector in a case where the incident light of an external light is utilized.

The reflector is made to have a characteristic of transmitting a portion of light and reflecting the other light, thereby enabling a display even by the incident light from an auxiliary light source.

An air layer with a small refractive index is provided by forming at gap between a first substrate and the reflector so that the scattering light from the polymeric dispersed liquid crystal layer is utilized again through the use of the reflection characteristic of the first substrate at the rear face, thereby enhancing a white color.

It is an important effect for a timepiece that the characteristic of the reflector and colors can be made uniform by virtue of the aforesaid gap, thereby making a display clear.

By the use of a reflection-type polarizing film as the reflector, the transmission part of the liquid crystal layer made of the liquid crystal and the polymer material utilizes the light in the reflection axis of the reflection-type polarizing film and reflects the incident light from a glass side, in addition to that, by interaction between the polarization axis of the reflection-type polarizing film and an optical polarization property of the liquid crystal or an optical rotation property, contrast between the transmission part and the scattering part can be improved.

Moreover, a selective reflection film for selectively reflecting light in a specific wavelength region in visible light region and transmitting the other light, for example, a cholesteric liquid crystal film made of a cholesteric liquid crystal fixed by a polymer, is used as the reflector, for instance, wavelengths which are to be selectively reflected are selected, thereby various reflected colors can be displayed. Furthermore, the wavelength of the auxiliary light source is made to have a wavelength except for the wavelength region which is selectively reflected by the cholesteric liquid crystal film, thereby the light from the auxiliary light source can be effectively utilized.

When the reflection characteristic of the reflector has a dependence on wavelength in the visible light region, the light from the auxiliary light source can be effectively utilized. Because the light emission characteristic of the auxiliary light source provided on the rear face of the first substrate with respect to the reflector is that the reflector does not reflect or absorb the light from the auxiliary light source by utilizing the characteristic of a wavelength having a complementary relation with the reflection characteristic of the reflector. The above is very effective because power consumption needs to be reduced as much as possible in a watch.

Even when a cholesteric liquid crystal film is used as the reflector, the selectively reflected light from the cholesteric liquid crystal film is converted in wavelength by a wavelength conversion layer provided at the auxiliary light source or between the auxiliary light source and the cholesteric liquid crystal film, and the reflected light by the cholesteric liquid crystal film is converted into the wavelength of the light to be transmitted when the auxiliary light source is turned on, thereby effectively utilizing the light of the auxiliary light source.

What is claimed is:

1. A liquid crystal display panel for a timepiece comprising:

a light scattering type liquid crystal cell structured by respectively forming an opposed electrode on a first substrate of a pair of transparent substrates and a signal electrode on a second substrate, and sealing a liquid crystal layer containing a liquid crystal and a polymer material between said first substrate and said second substrate to form pixel portions at intersections between said signal electrode and said opposed electrode;

a reflector placed on a side opposite to said opposed electrode with respect to said first substrate;

a light source having elements for absorbing light energy and emitting light in different wavelengths provided in said liquid crystal layer; and wherein said reflector is a reflection-type polarizing film which transmits light linearly polarized in a direction parallel to a transmission axis thereof and reflects light linearly polarized in a direction orthogonal to the transmission axis thereof and an auxiliary light source is provided on a side opposite to said first substrate with respect to said reflector.

2. The liquid crystal display panel for a timepiece according to claim 1, wherein a light absorption film is provided on a side opposite to said first substrate with respect to said reflector.

3. The liquid crystal display panel for a timepiece according to claim 1, wherein a color film with a low scatterability or a color filter is provided between said reflector and said first substrate.

4. The liquid crystal display panel for a timepiece according to claim 1, wherein a color film with a low scatterability or a color filter is provided between said reflector and said auxiliary light source.

5. The liquid crystal display panel for a timepiece according to claim 4, wherein said auxiliary light source is a light source having a light emission characteristic of a complementary color to a wavelength of a color reflected by said reflector.

6. The liquid crystal display panel for a timepiece according to claim 1, wherein a polarizing film is provided on said first substrate side or on an opposite side thereof with respect to said reflection-type polarizing film in such a manner that a transmission axis of said polarizing film and the transmission axis of said reflection-type polarizing film are nearly parallel or orthogonal to each other.

7. The liquid crystal display panel for a timepiece according to claim 6, wherein said auxiliary light source is provided at an outermost position on a side opposite to a visible side of said light dispersed type liquid crystal cell.

8. The liquid crystal display panel for a timepiece according to claim 1, wherein said reflection-type polarizing film is a reflection-type polarizing film which has a reflectance different in response to wavelength within a visible light region.

9. The liquid crystal display panel for a timepiece according to claim 8, wherein said auxiliary light source is provided at an outermost position on a side opposite to a visible side of said light dispersed type liquid crystal cell.

10. The liquid crystal display panel for a timepiece according to claim 9, wherein said auxiliary light source is a light source having a light emission characteristic of a complementary color to a wavelength of a color reflected by said reflector.

11. The liquid crystal display panel for a timepiece according to claim 1, wherein said auxiliary light source is a light source having a light emission characteristic of a complementary color to a wavelength of a color reflected by said reflector.

12. The liquid crystal display panel for a timepiece according to claim 1,
wherein said reflector is made so as to demonstrate a reflection characteristic different between at a region where scattering characteristic and transmission characteristic are controlled and at a region where the scattering characteristic or the transmission characteristic is always demonstrated, by applying a voltage to said liquid crystal layer of said light scattering type liquid crystal cell through said opposed electrode and said signal electrode.

* * * * *